Jan. 28, 1941.　　　G. J. LEHMANN　　　2,230,160
RADIO DEVICE FOR MEASURING ANGLES
Filed March 7, 1938　　　2 Sheets-Sheet 1
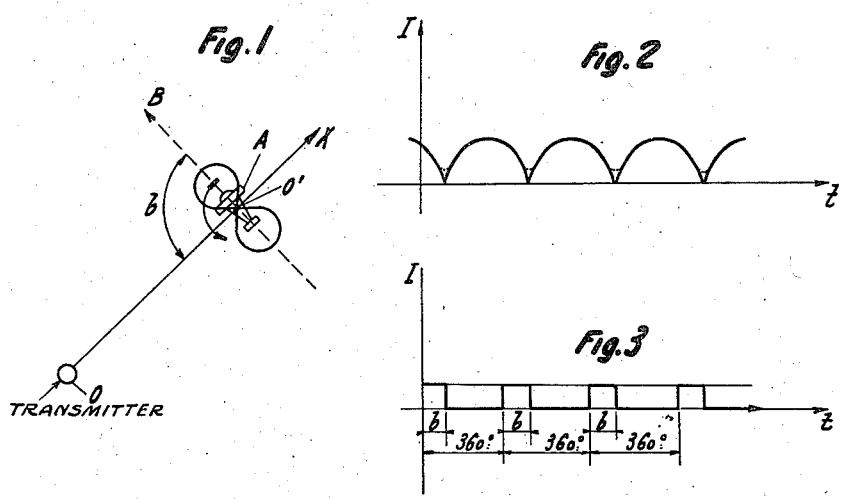
INVENTOR:
Gérard Jules LEHMANN
by
his Attorney

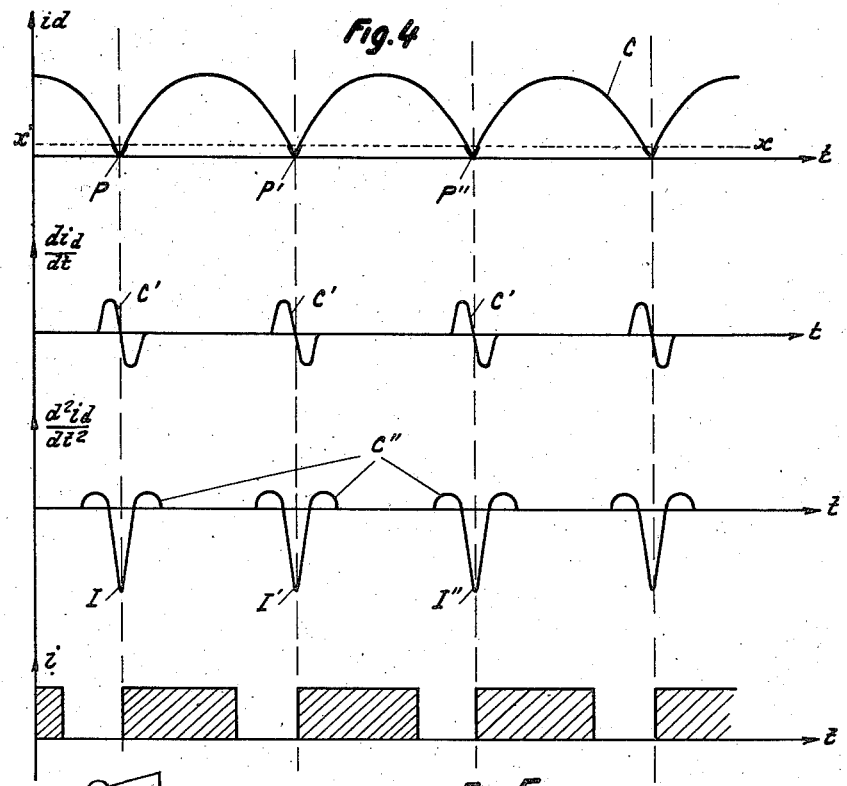
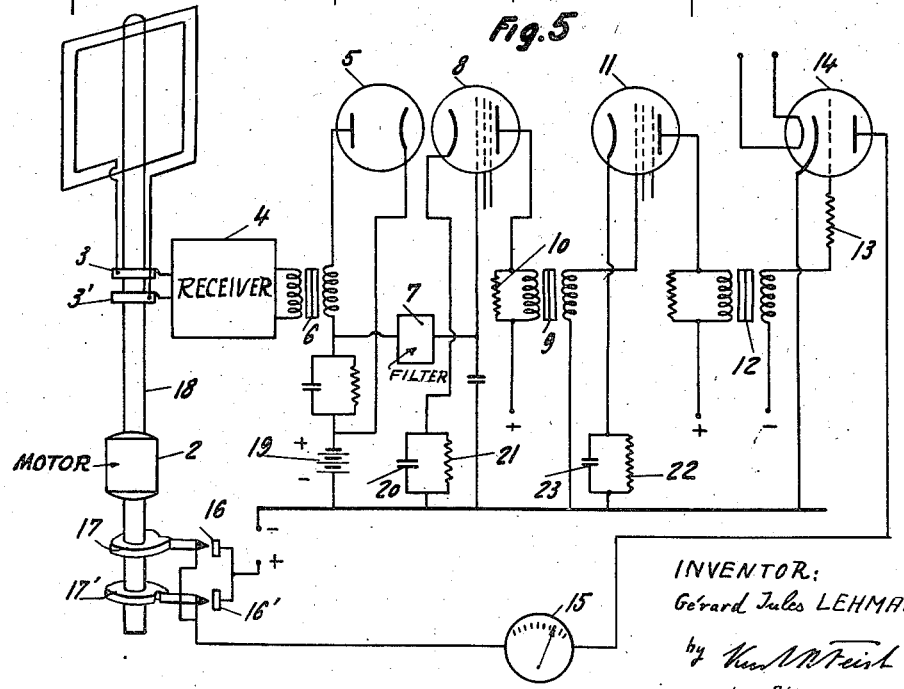

Patented Jan. 28, 1941

2,230,160

UNITED STATES PATENT OFFICE 2,230,160

RADIO DEVICE FOR MEASURING ANGLES

Gerard Jules Lehmann, Paris, France, assignor to Societe Anonyme des Industries Radioelectriques, Paris, France, a corporation of France Application March 7, 1938, Serial No. 194,259
In France March 10, 1937

10 Claims. (Cl. 250—11)

The present invention relates to direction-or position finding radio-electric apparatus of the kind used for the determination of the direction of a body, such as a ship or an airship carrying the receiving apparatus, with regard to a source of a radio-electric beam or field, wherein radiating or collecting means are employed to explore the field or to be traversed by a radiated beam or field, in order to determine from the results of this exploration the direction of the energy source relative to the receiving apparatus. Several systems have been proposed for an automatic determination of the direction from which radiated energy is received, wherein either a sending station is provided with a rotatable radiator or a receiving station is provided with a rotatable collector in such a manner that the effect of the received radiated energy varies periodically, means being provided at the receiving station for the determination of intervals which correspond to the angles covered by said radiator or collector. In some of the hitherto known apparatus, the receiver comprises means, such as relays, actuated at the moment when the rotatable directional radiator or collector passes through a geographical direction fixed with regard to the sending station or to the body carrying the receiver, and at the moment when the rotatable radiator or collector passes through a direction corresponding to the maximum or to the minimum pick-up, i. e., at the moment when the axis of the rotating directional beam of the sending station (which is usually called radio-beacon), or the axis of the maximum pick-up of the rotating collector, such as a frame or a loop, passes through the direction to be determined or through a direction perpendicular to the latter, respectively. The relays which thus are actuated twice during each revolution of the rotatable radiator or collector, control an electric or an electro-mechanical measuring device which automatically indicates the value of the angle between the two directions, corresponding to the responses of said relays.

According to the invention, the receiving apparatus is provided with means for generating a current the strength of which remaining constant during the time in which the axis of the rotatable directional radiator or collector corresponding to the maximum or to the minimum pick-up passes through the angle between a geographical direction fixed with regard to the sending station or to the receiver respectively and the direction to be determined, and said strength being nil during the remainder of the revolution of the rotatable radiator or collector. The receiving apparatus is also provided with a measuring apparatus bearing a scale calibrated in degrees, for measuring the average strength of the periodically interrupted current generated in the above described manner.

For this purpose, the circuit supplying the measuring apparatus is preferably provided with a relay which is energized once per revolution of the rotatable radiator or collector at the instant when the axis of the maximum or minimum pick-up of the latter passes through the direction fixed with regard to the transmitter or to the receiver, and is deenergized at the instant when the pick-up is at a maximum or at a minimum, respectively.

By way of example, an embodiment of the device which is the object of the invention has been described hereinafter and illustrated in the accompanying drawings.

Fig. 1 illustrates the principle of taking the bearings of a fixed transmitter from an aeroplane according to the radio-compass method.

Fig. 2 shows the form of the current produced in the receiver.

Fig. 3 shows the form of the current supplying the measuring apparatus controlled by the receiver.

Fig. 4 shows a diagram of the currents in a modification of the apparatus.

Fig. 5 is a complete diagram of the receiver of a radio-compass or of a radio-goniometer.

In Fig. 1, O is a fixed transmitting station arranged on the ground and has a circular radiating diagram. On board the aeroplane A an apparatus O' according to the invention is arranged for the purpose of informing the pilot of the angle $b$ formed between the direction OO'X in which he is located in relation to the fixed transmitter O, and a direction O'B, which is an integrant of the aeroplane, and may coincide with the axis of the fuselage. For this purpose, the receiver O' of the aeroplane is provided with a loop which rotates at a speed in the order of 20 revolutions per second for example and has a receiving pattern in the shape of an eight. Said loop generates a detected receiver current which has the form of the rectified sinusoid shown in Fig. 2. The points of minimum reception indicated by the points of this curve correspond to the passing of the axis of the rotating loop through the direction OX, said axis being perpendicular to the plane of the loop. On the shaft of the rotating loop a contact is arranged which produces an excitation of a relay controlling the circuit of a direct current moving coil measuring apparatus, whenever the axis of minimum pick-up of the rotating loop passes through the direction O'B, i. e. once per revolution. When the axis of minimum pick-up of the rotating loop passes through the direction OX at each point of minimum reception, the relay is automatically released and the current supplying the measuring apparatus is cut off. It will be apparent that said current has the form shown in Fig. 3: it is a periodically interrupted current, the period of which is equal to the time in which the loop rotates through 360°, whereas the successive durations of the flow of the current are equal to the time in which the loop rotates through the angle b. As said current is furthermore of constant strength during each of its flow intervals, it will be understood that its mean strength is equal to $$I \times \frac{b}{360°}$$

I being the constant strength of the current during its flow intervals, so that the moving coil measuring apparatus can be directly graduated in angle units.

The relay controlling the supply of the measuring apparatus is preferably formed by a gas-filled tube provided with a control grid and known in the trade as a "Thyratron," or by an oscillator operating in the unstable state, which may be energized and may supply a current of constant strength when a predetermined potential is applied to its grid, and which becomes de-energized when the grid potential receives a much lower negative value than that of the potential required for energization. The energizing potential will for example be sent on to the grid of this tube directly by the rotating contact actuated by the loop, at the instant when the axis of the latter passes through the direction O'B, whereas the very negative de-energizing potential will be created by the receiver when the axis of the loop passes through the direction of minimum reception OX.

The shaft of the loop is preferably provided with two diametrically opposite contacts so as to double the frequency of the periodical current supplying the measuring apparatus.

It should be noted that the mean value of the current which is sent into the measuring apparatus is independent of the strength of the reception and of the speed of rotation of the rotating loop, provided, however, that this speed is sufficiently high and does not vary during a revolution, or even during a half-revolution in case of a receiving pattern in the form of an 8 with two minimum points per revolution, and provided that the rotating aerial is arranged as stated above with two diametrically opposite contacts.

The receiver according to the invention may be of course located on the ground whereas the transmitter is arranged on board the aeroplane or a boat. This arrangement also permits the determination of the position of the aeroplane or of the boat, the apparatus forming in this case an automatic radio-goniometer.

As has been stated above, it is possible to consider a de-energizing of the gas relay which supplies the measuring apparatus at the instant when the loop passes through the direction to be found which corresponds to a minimum reception. However, in practice, the points of minimum reception are not always very sharp, in particular they are not nil, and the sharp points of the curve of the detected current shown in Fig. 2 are in fact replaced by rounded curves shown in dotted lines. Thus an improvement of the apparatus consists in reversing the control, so that now the gas tube, or the relay replacing same, is energized when the loop passes through the direction of the minimum reception and de-energized when it passes through the located direction, preferably by breaking the anode circuit of the gas tube by means of the contact actuated by the loop or by short-circuiting its anode and its cathode for a brief instant.

According to the invention, a short and intense current impulse which is suitable for energizing the gas tube is obtained when the loop passes through the point of minimum reception, by applying to the grid of said gas tube a voltage which, in the vicinity of minimum reception, varies in accordance with the second derivative of the detected reception voltage. The diagram of Fig. 4 shows the curve C of the detected reception current $i_d$ with its slightly sharp points P, P', P'', etc., the curve C' shows the first derivative $$\frac{di_d}{dt}$$

of the curve C in the vicinity of the sharp points P, P', P'', and the curve C'' shows the second derivative $$\frac{d^2 i_d}{dt^2}$$

of C in the vicinity of said points, and it will be readily understood that the change of sign of the slope of the curve C on either of the points P, P', P'', etc., in spite of its rounded shape, produces sudden variations I, I', I'', etc., of the second derivative. Said variations would have an infinitely great amplitude, if the curve C would have at P, P', P'' the sharp points of the theoretical curve instead of a sharp continuous bend as is true of the real curve.

On the other hand, as the variations of the detected current between the successive minimum points P, P', P'', etc., are not involved in producing the interrupted measuring current $i$, the system will be adjusted in such a manner that the voltage applied to the grid of the gas tube is constant during the intervals between the strong negative impulses I, I', I''. For this purpose the amplifier of the receiver is biassed in such a manner that no variation of voltage is transmitted to the gas tube as long as the detected current remains greater than a certain minimum value shown by the straight dotted line X'X of Fig. 4, whereby it is also rendered possible to eliminate the influence of the modulation of the transmission on the gas tube.

The second derivative of the detected current can be obtained by very simple means: as a matter of fact, it is known that when a variable voltage is applied to a circuit which includes the primary of a transformer, the voltage across the terminals of the secondary varies in accordance with the differential function of said primary voltage, provided, however, that the voltage induced in the primary winding is negligible as compared to the total voltage applied, that is to say that the resistance of the primary circuit is very high. By repeating the same operation a second time, the second derivative is obtained. Thus, these derived voltages may be obtained by applying the rectified voltage of the receiver to the grid of an amplifying tube having a high internal resistance, for example to a pentode, the anode circuit of which including the primary of a transformer, the secondary of the latter being connected to the grid of a second tube supplying a second transformer.

By way of example, in Fig. 5 a complete embodiment of an automatic radio-compass or radio-goniometer receiver is illustrated which operates according to the above mentioned principles. This apparatus comprises a rotating loop 1 which is driven by a motor 2 at a speed in the order of 300 to 1200 revolutions per minute and supplies by means of two rings 3, 3' an amplifying receiving set 4 of the normal type, the low frequency being rectified at the output in a diode 5 for example, which is coupled to the receiver 4 by a transformer 6. The current rectified by the diode has the shape of a rectified sinusoïd (curve C of Fig. 4) and is conducted to a filter 7. Said filter 7 serves to attenuate the influence of the noise and of the modulation on the minimum points of the rectified current and transmits the current to the grid of a first high internal resistance tube 8, for example a pentode in the anode circuit of which the primary of a transformer 9 is arranged. Preferably said primary is shunted by a resistance 10 which renders same aperiodic. As pointed out above, the voltage across the terminals of the secondary of the transformer 9 varies in accordance with the first derivative (curve C' of Fig. 4) of the detected current and is applied to the grid of a second pentode 11 which transmits through the medium of a transformer 12 and of a resistance 13 a voltage to the grid of a gas tube ("Thyratron") 14. Said transmitted voltage varies in accordance with the derivative of the detected current (curve C'' of Fig. 4). A moving coil measuring apparatus 15 is arranged in the anode circuit of the gas tube 14. Preferably, said apparatus 15 is graduated in angle units. Furthermore, the anode circuit of the gas tube 14 is controlled by two contacts 16, 16' arranged in parallel which are actuated by two cams 17, 17' mounted on the shaft 18 of the rotating loop 1. Said two contacts are so constructed that each supplies a long break, and they are arranged in such a relation to each other that they are opened at the same time for a very short period at each revolution of the loop, thereby producing an interruption of the anode circuit of the gas tube which causes the de-energization of the latter when the axis of the loop passes through the located direction.

In order to avoid the transmission of any variation of voltage besides the strong negative impulses corresponding to the points of minimum reception P, P', P'' (Fig. 4), to the grid of the "Thyratron" 14, one of the tubes of the amplifier, for example the first tube 8 operates with a positive bias which is lowered by the arrival of the signal: for this purpose, its grid is connected to the positive pole of a source of fixed potential 19, in the order of 15 to 20 volts for example through a resistance across which the signal voltage rectified by the diode 5 is applied in opposite direction, whereas a condenser 20 is arranged between its cathode and the ground. Said condenser 20 is shunted by a high resistance 21, so that the time constant of the circuit 20—21 is by far greater than the period of rotation of the loop (for example, the resistance 21 is in the range of 250,000 ohms, while the condenser 20 is of 5 microfarads). By means of this arrangement, the tube 8 will allow a current to flow into its anode circuit only at the instant when the voltage applied to its grid by the detecting diode 5 is at a minimum, whatever may be the value of said minimum. The second amplifying tube 11 operates as a class A amplifier and is biased by a shunted cathode resistance 22—23 of normal value.

It should be noted that a plurality of measuring apparatus may be arranged in the anode circuit of the "Thyratron" 14, one of which, such as the apparatus 15, may serve for a direct reading of the measured angle, whereas the others may serve, for example, for recording or for transmitting the variations of said angle to a remote place.

Of course, apart from the application described above for taking bearings, the invention can be used in all cases in which it is required to measure and/or to transmit to a remote place the value of any angle. For example the invention may be used for telemeasuring installations, the sweeping of the angle to be measured being carried out by means which are appropriate to each particular case.

What I claim is:

1. Automatic wireless direction finding device for measuring the angle formed by the direction of a datum line with the direction to be found, in which a transmitting station is positioned, this device comprising a directional antenna continuously rotating at a substantially constant speed, whereby the angle to be measured is swept through at each revolution of said antenna, and a receiver provided with means for producing a periodic current which is of a constant strength during rotation of said antenna corresponding to the sweep of the angle to be measured and is nil during the remainder of the sweep, and an apparatus for measuring the mean strength of the periodically interrupted current thus produced.

2. Automatic wireless direction finding device for measuring the angle formed by the direction of a datum line with the direction to be found, in which a transmitting station is positioned, this device comprising a directional antenna continuously rotating at a substantially constant speed, a commutator actuated by said antenna, a receiver, a circuit comprising a source of current and a mean current measuring apparatus, a relay controlling said circuit, means for actuating said relay twice during each revolution of said rotating antenna by the commutator and by the receiver respectively, when said antenna passes through the direction of the datum line and through the direction to be found respectively.

3. Automatic wireless direction finding device for measuring the angle formed by the direction of a datum line which is fixed relatively to said device, with the direction to be found, in which a transmitting station is positioned, this device comprising a receiver, a loop continuously rotating at a substantially constant speed, a circuit comprising a source of current and a mean current measuring apparatus, a relay controlling said circuit, means for actuating said relay by the receiver when the rotating loop passes through the direction to be found, a contact also controlling said circuit and actuated by the rotating loop when it passes through the fixed datum line.

4. Automatic wireless direction finding device for measuring the angle formed by the direction of a datum line which is fixed relatively to said device, with the direction to be found, in which a transmitting station is positioned, this device comprising a receiver, a loop continuously rotating at a substantially constant speed, a gas-filled tube provided with a grid and producing a substantially constant current when it is energised, a mean-current measuring apparatus connected to the output circuit of said tube, means for energising said tube by the receiver when the rotating loop passes through the direction to be found, a contact actuated by said rotating loop and cutting off the output circuit of said tube when the rotating loop passes through the fixed datum line.

5. Automatic wireless direction finding device for measuring the angle formed by the direction of a datum line which is fixed relatively to said device, with the direction to be found, in which a transmitting station is positioned, this device comprising a receiver, a loop continuously rotating at a substantially constant speed and supplying the receiver, means in said receiver for amplifying and rectifying the current produced in the rotating loop, a gas-filled tube provided with a grid, producing a substantially constant current when it is energised, a mean current measuring apparatus connected to the output circuit of said tube, means for applying to the grid of said tube a voltage derived from the current rectified in the receiver when the rotating loop passes through the direction to be found, a contact actuated by the rotating loop and cutting off the output circuit of said tube when the rotating loop passes through the fixed datum line.

6. Automatic wireless direction finding device for measuring according to the radio-goniometer or the radio-compass method, the angle formed by a direction located relatively to said device with the direction in which is located a transmitter, comprising a receiver, a rotating loop supplying said receiver, in said receiver means for detecting the current produced in the rotating loop, means for obtaining a current which varies as the second derivative of the detected current of the loop, a thyratron, means for supplying said thyratron by said derivative current at the instant when the rotating loop passes through the direction of minimum reception, a contact actuated by the rotating loop at the instant when it passes through the located direction, means for breaking by means of said contact the anode circuit of the thyratron, and a moving coil apparatus for measuring the mean strength of the anode current of the thyratron.

7. Automatic wireless direction finding device for measuring according to the radio-goniometer or the radio-compass method, the angle formed by a direction located relatively to said device with the direction in which is located a transmitter, comprising a receiver, a rotating loop supplying said receiver, in said receiver a detector, a high internal resistance amplifying tube the input circuit of which is connected to said detector, a transformer in the output circuit of said amplifier tube, a second high internal resistance amplifier tube the input circuit of which is supplied by said transformer, a second transformer arranged in the output circuit of said second tube, a thyratron the grid of which is connected to the second transformer, a contact actuated by the rotating loop at the instant when it passes through the located direction, means for breaking by means of said contact the anode circuit of the thyratron, and a moving coil apparatus for measuring the mean strength of the anode current of the thyratron.

8. Automatic wireless direction finding device for measuring according to the radio-goniometer or the radio-compass method, the angle formed by a direction located relatively to said device with the direction in which is located a transmitter, comprising a receiver, a rotating loop supplying said receiver, in said receiver a detector, a high internal resistance amplifier tube the input circuit of which is connected to said detector, a transformer in the output circuit of said amplifier tube, means for blocking said tube save at the instants corresponding to the instants of minimum detected current of the loop, a second high internal resistance amplifier tube the input circuit of which is supplied by said transformer, a second transformer arranged in the output circuit of said second tube, a thyratron the grid of which is connected to the second transformer, a contact actuated by the rotating loop at the instant when it passes through the located direction, means for breaking by means of said contact the anode circuit of the thyratron, and a moving coil apparatus for measuring the mean strength of the anode current of the thyratron.

9. Automatic wireless direction finding device for measuring according to the radio-goniometer or the radio-compass method, the angle formed by a direction located relatively to said device with the direction in which is located a transmitter, comprising a receiver, a rotating loop supplying said receiver, in said receiver a detector, a source of fixed potential, a pentode amplifier the control grid of which is connected on the one hand to said detector and on the other hand to the positive pole of said source, a filter arranged between the control grid of said pentode and the detector, between the cathode of said pentode and the ground a condenser shunted by a high resistance, a second pentode amplifier, a transformer connecting the anode circuit of the first pentode to the grid circuit of the second, a thyratron, a transformer connecting the anode circuit of the second pentode to the grid circuit of the thyratron, a contact actuated by the rotating loop at the instant when it passes through the located direction, means for breaking by means of said contact the anode circuit of the thyratron, and a moving coil apparatus for measuring the mean strength of the anode current of the thyratron.

10. Automatic wireless direction finding device for measuring according to the radio-goniometer or the radio-compass method, the angle formed by a direction located relatively to said device with the direction in which is located a transmitter, comprising a receiver, a rotating loop supplying said receiver, in said receiver a detector, a source of fixed potential, a pentode amplifier the control grid of which is connected on the one hand to said detector and on the other hand to the positive pole of said source, a filter arranged between the control grid of said pentode and the detector, between the cathode of said pentode and the ground a condenser shunted by a very high resistance, a second pentode amplifier, a transformer connecting the anode circuit of the first pentode to the grid circuit of the second, a thyratron, a transformer connecting the anode circuit of the second pentode to the grid circuit of the thyratron, two long break contacts mounted in parallel in the anode circuit of the thyratron, actuated by the rotating loop and arranged with respect to each other in such a manner as to be open both at once for a short instant when the axis of the rotating loop passes through the located direction, and a moving coil apparatus graduated directly in angle units for measuring the mean strength of the anode current of the thyratron.

GERARD JULES LEHMANN.